United States Patent [19]

Lezan et al.

[11] 4,355,242
[45] Oct. 19, 1982

[54] VOLTAGE REGULATING SYSTEM

[75] Inventors: Georges R. E. Lezan; Marvin W. Smith, both of Roanoke; Loren H. Walker, Salem, all of Va.

[73] Assignee: General Electric Company, Salem, Va.

[21] Appl. No.: 917,137

[22] Filed: Jun. 19, 1978

[51] Int. Cl.³ .............................................. H03K 17/60
[52] U.S. Cl. .............................. 307/252 N; 307/252 B
[58] Field of Search ........................ 250/252 N, 252 B

[56] References Cited

U.S. PATENT DOCUMENTS 3,925,688 12/1975 Kalfus ............................. 307/252 N

*Primary Examiner*—Harold A. Dixon
*Attorney, Agent, or Firm*—Arnold E. Renner; James H. Beusse

[57] ABSTRACT

A voltage regulating or control system employing a triac for controlling the power supplied to a load from an alternating current (a.c.) voltage source uses an oscillator as a phase controller to initiate a first switching pulse in each half-cycle of the voltage source. A feedback loop responsive to the first pulse in each half-cycle acts to increase the output frequency of the oscillator to thereby provide pulse train firing of the triac. An additional circuit acts to define a "window" which serves to establish a period within each half-cycle of the a.c. source during which the delivery of switching of pulses is prohibited.

12 Claims, 3 Drawing Figures

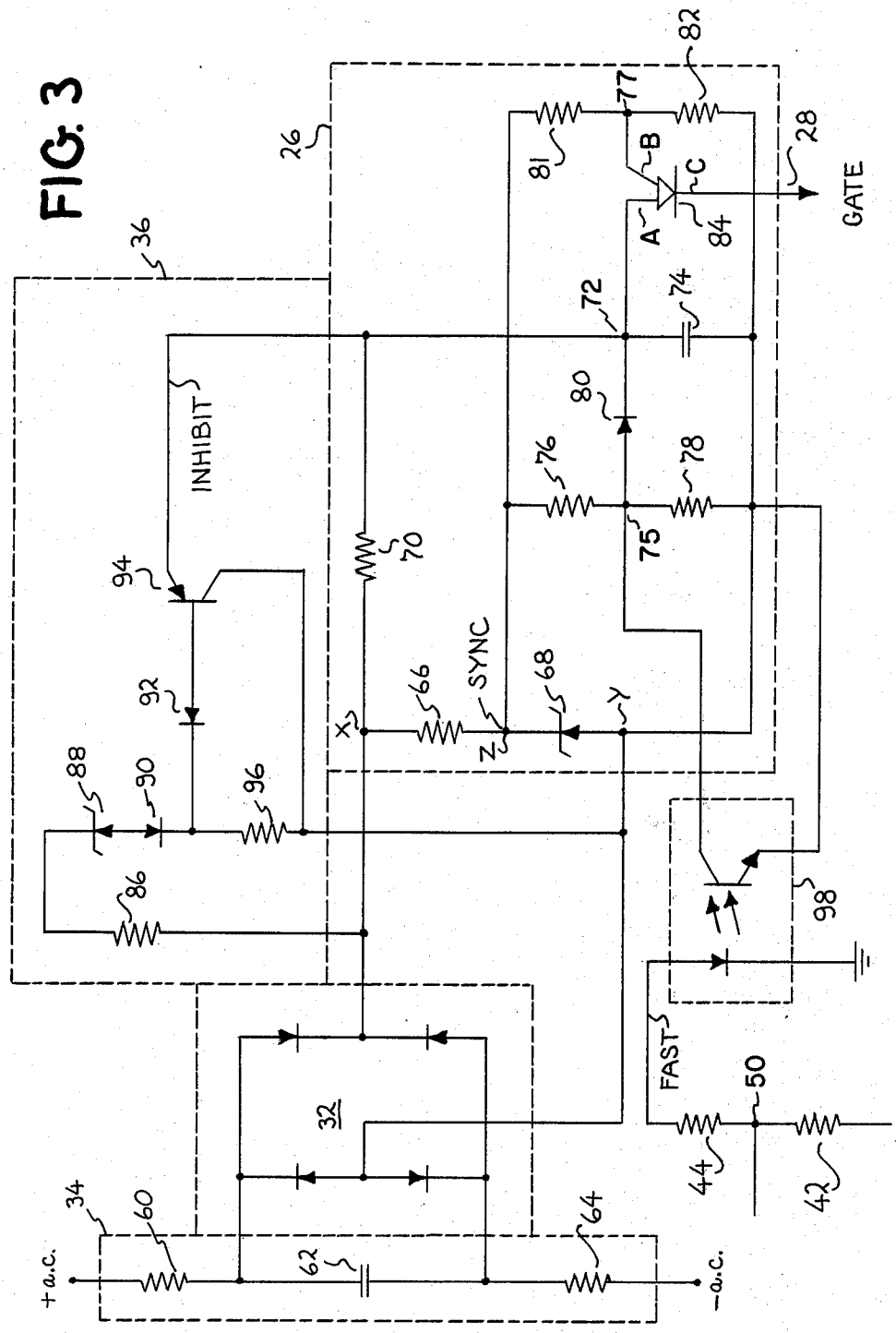

VOLTAGE REGULATING SYSTEM

BACKGROUND OF THE INVENTION

The present invention relates generally to voltage regulators or control systems employing triacs to control the power supplied to a load from an alternating current (a.c.) voltage source.

As is known, a triac is a bidirectional semiconductor device which exhibits the property of being "gated" into conduction upon the simultaneous application of a voltage between its two main electrodes and a gating signal applied to a third or gate electrode. Triacs are normally rendered nonconductive by removing the voltage from the main electrodes; for example, by the source voltage crossing the zero axis.

In those instances where the a.c. source voltage is "clean", that is the voltage follows a substantially pure sinusoidal wave shape, few problems are experienced in maintaining good control. Where, however, the source voltage is "dirty" and includes any significant number of transients, more serious problems are presented. If a transient of a sizeable magnitude in a direction to reduce source voltage occurs at the same time that a pulse gating signal is applied to the triac, the triac may not fire (become conductive) and control may be lost. In a similar manner, if a transient of this nature occurs shortly after the triac begins conduction but prior to the establishment of a sizeable current in the triac, the current may extinguish and once again control would be lost. The loss of control can be particularly troublesome when that being supplied is a transformer coupled load. In this case, with the cessation of the triac conduction, buildup of a d.c. current in the transformer may develop with subsequent loss of control resulting in transformer saturation which, in turn, could cause heavy line currents.

One prior art method of overcoming this problem is to use what is known as pulse train firing. In its simplest conceptual form, pulse train firing entails the sensing of a point in the a.c. source wave form where initiation of conduction is desired. This sensing must be accurate and employed to gate, for a specified period within the half cycle of the source voltage, a series of pulses from an oscillator to the gate electrode of the triac. Thus, if the device should fail to conduct due to a transient "spike" in the source voltage, as soon as the transient disappears the device will be gated into conduction by the next pulse of the train. While prior art pulse train gating is a very satisfactory solution from an operational standpoint, it is also one which is relatively expensive which makes its use difficult to justify in many instances. The expense of the pulse train firing system results primarily from the fact that the point of conduction initiation must be accurately determined which requires, in the usual case, that the normal zero crossover point of the source voltage be accurately determined. To do this, the customary practice is to provide an accurate d.c. supply voltage to energize a plurality of integrators which are used to cancel out the transient effects and provide the zero crossing detection.

SUMMARY OF THE INVENTION

It is, therefore, an object of the present invention to provide an improved triac voltage regulator and control therefor.

It is another object to provide an inexpensive triac voltage regulator which provides more than a single opportunity to fire the triac.

It is a further object to provide a control circuit for a triac which uses a single oscillator to perform basic phase control and a subsequent pulse train firing of the triac.

The foregoing and other objects are satisfied in accordance with the present invention through the provision of a firing control for a triac used to connect a load to an a.c. source. The control system includes an oscillator operative to produce pulses effective to render the triac conductive. This oscillator is operable in first and second modes with the second mode being at an operational frequency which is much higher than the first mode. Stated in another way, the spacing between adjacent pulses in the second mode is much less than in the first mode. Oscillator operation in the first mode is initiated by supplying the oscillator with a first signal indicative of the value of the source voltage and with a second signal indicative of the voltage across the load. Basic phase control is established in response to these two signals. A feedback loop is connected to the oscillator which loop includes suitable circuitry responsive to the first pulse produced by the oscillator in each half-cycle of the source voltage to generate a signal to force the oscillator to the second mode of operation. To insure that the triac is not fired at a time which could result in an improper reversed current, the control further includes circuitry to provide an inhibiting signal which precludes the application of signals to the triac at prescribed points in each half-cycle of the source voltage. These points are determined as a function of the source voltage being below a prescribed value.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
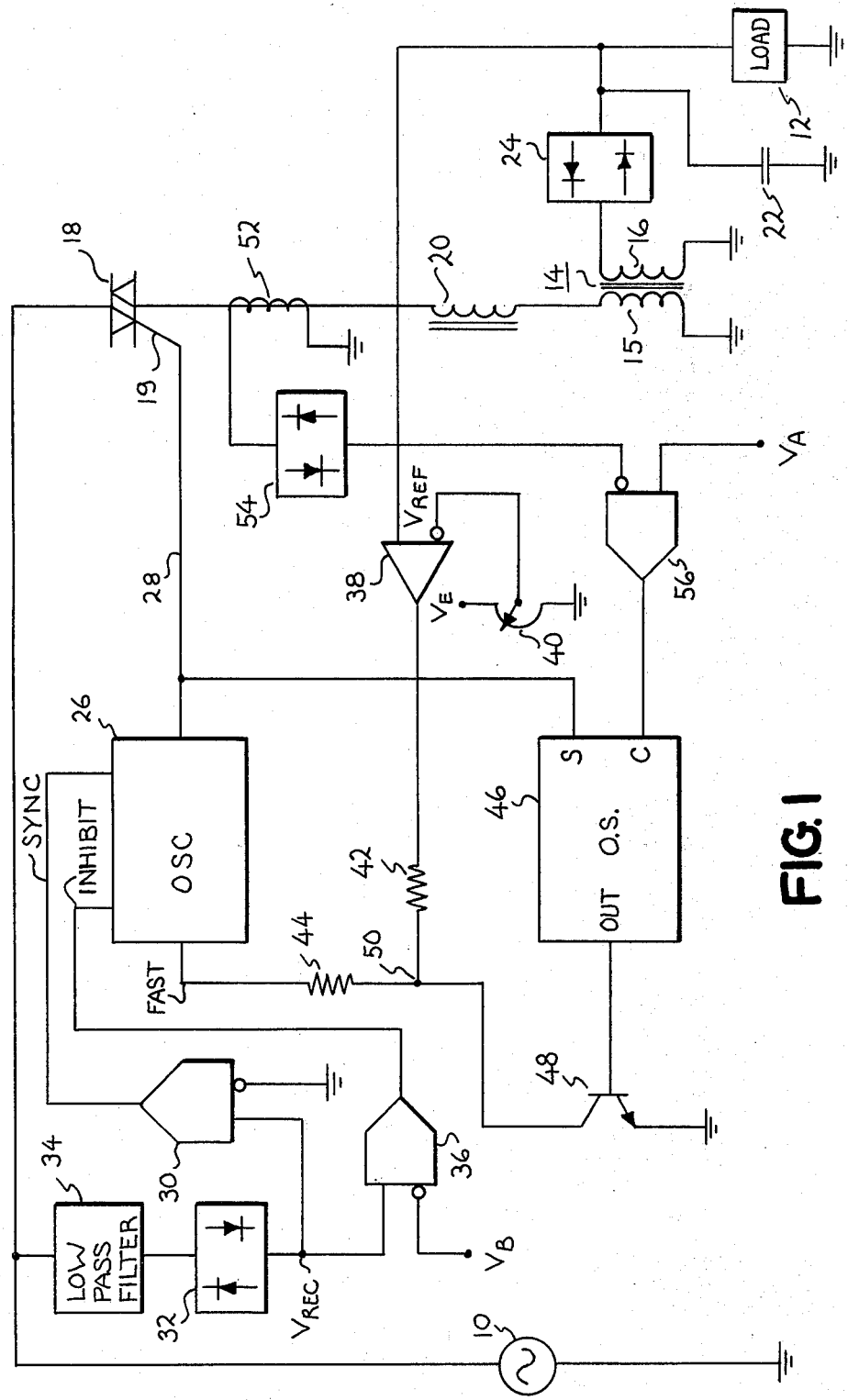
FIG. 1 is a schematic diagram showing the present invention in its preferred embodiment.

Reference is now made to FIG. 1 which shows the present invention in its preferred embodiment. As shown in FIG. 1, an a.c. source 10 serves to provide electrical power to a suitable load 12 by way of a power transformer 14 having a primary winding 15 and a secondary winding 16. The amount of current delivered to the load 12 from the source 10 is a function of the conduction period of a triac 18 which has a gate electrode 19. As shown in FIG. 1, the power circuit further includes an inductor 20 in series with the primary winding 15 of the transformer and a capacitor 22 associated with the secondary winding 16. Inductor 20 and capacitor 22 collectively form a filter network. A full wave rectifier 24 is shown interposed between the load 12 and the secondary winding 16 such that d.c. power is supplied to the load 12.

As earlier indicated, the average voltage or the amount of power delivered to the load is a function of the conduction period of the triac 18; i.e., the percentage of time during each half-cycle of the source voltage during which triac 18 conducts. This control is a function of the time of application of gating signals applied to the gating electrode 19 which are derived from a suitable pulse source, shown in FIG. 1 as an oscillator 26. Oscillator 26 is preferably of the relaxation type but, as will become evident, any suitable form of pulse source may be employed in the present invention. The output of the oscillator 26 on line 28 is a function of three input signals labeled "SYNCH" (synchronization), "INHIBIT" and "FAST". The SYNCH input to oscillator 26 is the output of a comparator 30 which has its inverting input connected to ground and receives, at its noninverting input, the output of a full wave rectifier 32. Rectifier 32 receives as its input the output of a low pass filter 34 which in turn is connected to the source 10.

Figure 2:
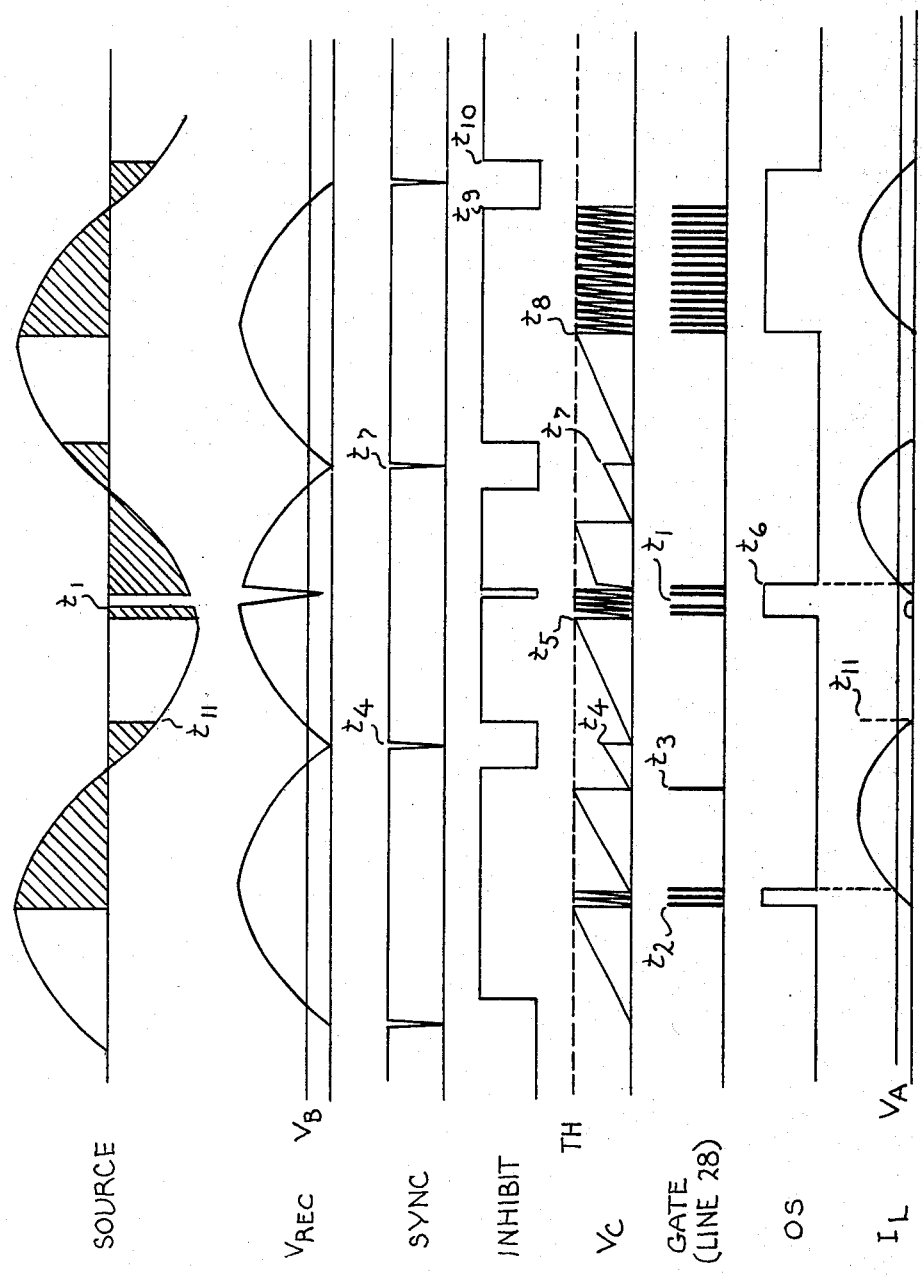
FIG. 2 illustrates various wave shapes useful in the understanding of the operation of the present invention; and, FIG. 3 is a schematic drawing showing in greater detail a portion of the elements shown only in block form in FIG. 1.

The SYNCH signal from comparator 30 is a narrow pulse occurring once per half-cycle of the source frequency. This may best be understood with reference to FIG. 2. Referencing now FIG. 2, the uppermost wave form labeled "source" represents the output of the source 10 and is depicted as a sine wave. At a time $t_1$ in the second or middle half-cycle of this wave shape as shown in FIG. 2, a discontinuity in the form of a transient which temporarily causes the voltage to go to approximately zero is illustrated. The effects of this type of transient are that which the present invention is designed to overcome and more will be said about this discontinuity at a later time. The second depiction of FIG. 2, labeled $V_{REC}$, is the output of the full wave rectifier 32. It is seen that it is merely the full wave rectification of the source voltage which has experienced a slight shift in phase due to the low pass filter 34. It is also noted that, as shown, the filter has acted to modify, as intended, the transient disturbance at time $t_1$. The third showing in FIG. 2 is labeled SYNCH and it is seen that it is a narrow pulse at the valleys of $V_{REC}$.

Returning again to FIG. 1, the output of rectifier 32 is also applied as the noninverting input to a comparator 36 which has its inverting input connected to a source of positive voltage $V_B$. The output of comparator 36 is the INHIBIT signal which is also illustrated in FIG. 2 and shown to be derived as a function of the signal $V_{REC}$ and the voltage $V_B$. Referencing FIG. 2, it is seen that the INHIBIT signal rises when $V_{REC}$ exceeds the value of $V_B$ and falls to zero when $V_{REC}$ is less than $V_B$. Thus, "windows" are developed which include the end of each half-cycle and the beginning of the next half-cycle. This prohibits any attempt to fire the triac when the source voltage is low. As is also shown, the transient will appear in the INHIBIT signal but it will be very small and is of very little consequence as will be understood as this description proceeds.

Oscillator 26 (FIG. 1) is synchronized to the source voltage by the SYNCH signal and is prevented from providing an output signal when the INHIBIT signal is low. The rate at which the oscillator provides output pulses is the function of the value of the FAST signal, an analog signal made up of two components. The first of these components is an error signal derived from a differential amplifier 38 which receives at its noninverting input a signal proportional to the load voltage. A reference voltage $V_{REF}$ is applied to the inverting input of amplifier 38 and is symbolically shown in FIG. 1 as being derived by way of the wiper arm of a potentiometer 40 connected between a source of positive potential $V_E$ and ground. $V_{REF}$ establishes a desired level of operation while the load voltage represents the actual level of operation. As such, the output of amplifier 38 may be considered an error signal representing any deviation of operation from that desired. That is, if the two signals applied to amplifier 38 are of equal magnitude the system is working at the desired level and no change in the phase control of the oscillator will take place. If there is a difference in these signals, then the output of the amplifier 38 which is supplied to the oscillator 26 by way of a pair of series connected resistors 42 and 44 will affect the initial phase angle (time) of the first oscillator firing pulse. Stated in another way, the magnitude of the FAST signal will determine the amount of time between the occurrence of the SYNCH signal and the generation of a pulse on line 28 all in a manner of phase control as is well known in the art.

As was earlier stated, oscillator 26 is designed to operate in two modes, a regular (slow) mode and a higher frequency (fast) mode. To achieve the second operational mode, a feedback loop connects the output of the oscillator 26 to the S input of a monostable multivibrator or "one-shot" 46. The output of the one-shot is connected to the base of a transistor 48 which has its emitter connected to the ground and its collector connected to junction 50 between the two resistors 42 and 44. When one-shot 46 outputs a signal to the base of transistor 48, rendering that transistor conductive, junction 50 is taken to ground such that the voltage (the FAST signal) applied to the oscillator is essentially at ground potential. This, as will be explained in more detail, causes the oscillator to run at a much higher frequency than with the application of a voltage of some higher value and is the second mode of operation. The fast mode of operation will continue until the one-shot "times out" and the output drops or until, as shown in FIG. 1, there is applied to the C terminal thereof a signal clearing the one-shot.

In the embodiment of the invention actually built, the signal applied to the C terminal of the one-shot was indicative of the fact that load current existed. As will be further explained in a later embodiment, this is a feature which is not necessary in the invention. It is, however, here shown for purposes of completeness. As shown in FIG. 1, a current transformer 52 is connected to sense the load current as supplied to the transformer primary winding 15. The output of the current transformer 52 is rectified by a full wave rectifier 54 whose output is furnished to the inverting input of a comparator 56. The noninverting input of comparator 56 is connected to a source of suitable positive potential $V_A$. When the current exceeds a prescribed value determined by the voltage $V_A$, the comparator 56 will output a signal to the C terminal of the one-shot 46 clearing that one-shot and thus removing the biasing voltage from the base of transistor 48.

The overall operation of the circuit of FIG. 1 may be best understood when taken with the total showing of FIG. 2 which includes three additional, previously undescribed wave forms, $V_C$, OS and $I_L$. As will be more fully appreciated when FIG. 3 is discussed later in this specification, the output of the oscillator 26 used in this embodiment is a function of the charging of a capacitor which is shown in FIG. 2 as wave form $V_C$. For convenience sake, FIG. 2 will be discussed in three parts with regard to the first, second and third half-cycles from left to right of the source voltage in FIG. 2.

Referencing now FIGS. 1 and 2 in combination, it is seen in wave shape $V_C$ that with each occurrence of the SYNCH signal the capacitor is discharged and then begins to charge towards a threshhold (TH) level. The rate of charging (the slope of the line) will, in this instance, be a function of the value of the FAST signal; i.e., the output of amplifier 38. When the capacitor charges to the threshhold, it will immediately discharge and will create the first output pulse or gating signal on line 28 as is shown at time $t_2$. This pulse will be applied to the triac to gate the triac on and will also be applied to the S terminal of the one-shot 46 setting the one-shot as noted in the OS wave form. With the gating on of the triac 18, load current $I_L$ will begin to flow and to build up. (The showing of $I_L$ in FIG. 2 is essentially that for an inductive load. It should be also noted that what is here shown as $I_L$ is more correctly described as a rectified representation of the load current such as would be found at the output of the rectifier 54.) If it is assumed that the current build up is rather slow as indicated, with the setting of the one-shot 46 transistor 48 will conduct pulling the FAST signal to substantially ground potential such that the capacitor will now charge at a very rapid rate to create additional pulses on line 28 very quickly after the initiation of the first pulse. This is illustrated by the two additional pulses shown to the immediate right of time $t_2$. When $I_L$ reaches the reference level $V_A$, a clear signal is applied to the one-shot and the one-shot output goes to a low level turning off transistor 48 and returning the oscillator to the slow mode of operation under the control of the value of the output of amplifier 38. The triac in this instance is indicated as continuing to conduct. If the triac conduction period is long enough compared to the charging rate, an additional gate pulse(s) may be generated as represented by the pulse shown at time $t_3$. Any such pulse(s) generated, however, is of no consequence in that the triac is already in conduction.

When the voltage $V_{REC}$ goes below the reference level $V_B$, the inhibit signal will drop and subsequently the SYNCH signal will drop once again causing the capacitor to discharge (time $t_4$). As the source voltage goes through zero, the load current will begin to diminish. The triac will stop conducting when the current goes to zero at time $t_{11}$. This half-cycle demonstrates the normal operation of the system when no faults of a nature such as a transient occur.

Looking now to the second half-cycle of the wave forms of FIG. 2, it is noted that at time $t_4$ the SYNCH signal drops to zero a second time to first discharge the capacitor after which it will again begin to charge toward the threshhold level which is reached at time $t_5$. The capacitor discharges resulting in a first gate pulse for this half-cycle. Once again the one-shot is set and load current begins to flow. In this half-cycle depiction, however, shortly after the initial or phase control firing pulse, there occurs the transient earlier mentioned (time $t_1$). This transient will cause the INHIBIT signal to drop and will, of course, also remove the voltage from the main electrodes of the triac 18 permitting it to cease conduction. The load current, as shown by $I_L$, will, therefore, not build up sufficiently to exceed the value $V_A$. Because the current did not build up, the one-shot did not clear and hence the fast mode of oscillator operation will continue even though the temporary drop in the INHIBIT signal prohibited the generation of one of the gating pulses. As is shown in the gate wave form, as soon as the transient disappeared, the gating pulses return to again render the triac conductive. The repetitive gate pulses continue to reset (retrigger) the one-shot so that the oscillator continues to deliver the pulse train until time $t_6$ when current finally builds up enough to assure that the triac will remain in conduction for this half-cycle. At time $t_6$ the one-shot is cleared by the rise of current $I_L$ above $V_A$ thus removing the ground from the FAST signal and allowing the capacitor to charge at the slow rate as earlier described. As such, gating is maintained until it is assured that the load current $I_L$ will build up as indicated. Thus, the system is able to recover from a situation which otherwise might have caused a loss of control.

It was earlier mentioned that the current feedback path was not critical to the present invention and that in some respects the operation of the present invention would be superior without this path. Specifically, the feedback path here referred to includes the current transformer 52, rectifier 54 and comparator 56 with its associated reference $V_A$. The third, or last half-cycle depiction of FIG. 2 illustrates the manner in which the invention would operate without this particular inclusion. As shown in FIG. 2, at the time of the SYNCH pulse shown at $t_7$ the capacitor would once again discharge and then immediately begin to charge at a rate corresponding to the value of the signal from amplifier 38 (FIG. 1). Upon reaching the threshhold value (time $t_8$) it would discharge and the first gating pulse would be generated to thus establish the basic phase control. With the occurrence of the first pulse, one-shot 46 will be set and the second mode of operation will begin. Since in the absence of the input to the C terminal of the one-shot there is nothing to turn it off except its normal time out and since the gate pulses will continue to set the one-shot so long as they occur, the pulses will continue and the one-shot output will remain high until normal time out after the gate pulses are terminated by the INHIBIT signal which occurs at time $t_9$. It is necessary, in this embodiment, that the one-shot has a normal time out period less than the window period; i.e., $t_9-t_{10}$, so that the cessation of pulses at time $t_9$ would allow the one-shot to time out prior to the time when it is permissible to generate the next pulse; that is, before time $t_{10}$. As before, the current $I_L$ will develop. It is noted that this embodiment of the present invention has one major operational advantage over the one with the current feedback loop. That advantage is that, if for any reason after the initial firing of the triac 18 it were to cease conduction, additional gating pulses throughout the remaining portion of the half-cycle would be available to attempt a restart of the triac into conduction.

While it is believed that the foregoing description of FIGS. 1 and 2 is sufficient to enable one skilled in the art to practice the present invention, for purposes of completeness a portion of the circuitry shown in block form in FIG. 1 is shown in greater detail in FIG. 3. The portion to be shown in greater detail includes the oscillator 26 and its immediate inputs. In FIG. 3, the a.c. source 10 is represented by the terminals +a.c. and —a.c. Connected between these two terminals is a series combination of a resistor 60, a capacitor 62 and a second resistor 64 which series combination comprises the low pass filter 34 of FIG. 1. A 4-diode bridge, indicated generally at 32, corresponds to the full wave rectifier 32 of FIG. 1 and is connected across capacitor 62.

Oscillator 26 is shown as having three input terminals X, Y and Z. The X and Y terminals are connected to the bridge 32 while the Z terminals receives the SYNC signal. A resistor 66 is located between the X and Z terminals and a zener diode is found between the Z and Y terminals. Terminal X is further connected by way of a resistor 70 to a junction 72 which is connected to the upper plate of a capacitor 74 across which the voltage $V_C$ of FIG. 2 is generated. The other plate of capacitor 74 is connected to terminal Y. A voltage divider comprised of resistors 76 and 78 is placed in parallel with the zener diode 68 and junction 75 of resistors 76 and 78 is connected by way of a diode 80 to junction 72. A further input to junction 72 is the INHIBIT signal. The INHIBIT signal, as earlier discussed, is the output of comparator 36, the details of which will be later discussed.

A second voltage divider comprised of resistors 81 and 82, connected at junction 77, is connected in parallel with the earlier mentioned divider (resistors 76 and 78). A programmable unijunction transistor 84 having a first input terminal A, connected to junction 72, a second input terminal B, connected to junction 77, and an output terminal C, connected to line 28, for the passage of the gating signals to the triac 19 (FIG. 1) completes the physical structure of the oscillator 26. As is known, transistor 84 will become conductive when the potential at its A terminal exceeds that at its B terminal and will remain conductive until such time as the current therethrough approaches zero.

Before beginning a description of the operation of the oscillator 26, it is believed desirable to first describe the application of the FAST signal to the oscillator 26. FIG. 3 includes, for purposes of orientation, the two resistors 42 and 44, and it will be remembered from the FIG. 1 description that junction 50 of these resistors receives the output of the monostable multivibrator or one-shot 46 while the signal from amplifier 38 is applied to the free end of resistor 42. The signal appearing at the end of resistor 44, other than that connected to junction 50, is the FAST signal. In accordance with good engineering practices, the FAST is applied to the oscillator 26 by way of suitable isolation means shown as an optical isolating element 98 which is connected across resistor 78 of the oscillator 26. It will be remembered from the FIG. 1 description that the FAST signal as here employed exists in either an essentially zero potential state or a positive potential state and that these two states effect the fast and slow modes, respectively, of oscillator 26.

Looking now to the operation of the oscillator 26, it is to be first understood that with transistor 84 in the nonconducting state, capacitor 74 will charge at a rate proportional to the value of the voltage at junction 72. When the voltage value on the upper plate of capacitor 74 (terminal A of transistor 84) exceeds that at junction 77 (terminal B of transistor 84), transistor 84 will conduct to thereby discharge capacitor 74 and generate a triac firing pulse on line 28. (As is understood by those skilled in the art but which is not, in accordance with standard one-line drawing practices, shown in FIG. 1, the cathode of triac 18 will be in circuit with the bottom plate of capacitor 74.) The primary charging path for capacitor 74 is from terminal X by way of resistors 66 and 76 and divide 80.

Assume first that the FAST signal is at its positive potential level. As such, element 98 is conducting and resistor 78 is essentially short circuited. Under these conditions, capacitor 74 will charge relatively slowly to the threshold level (FIG. 2, line $V_C$) established by way of voltage appearing at junction 77 (terminal B of transistor 84). When, however, the FAST signal is at its substantially zero potential level, element 98 will be nonconducting, resistor 78 will be effective in the circuit and the voltage to capacitor 74 will be of a much higher value to thus effect the higher charging rate of that capacitor. In this manner, the two basic rates of gate pulse generation shown in FIG. 2 are achieved.

From the earlier description of FIGS. 1 and 2, it will be remembered that the SYNC signal is a negative going pulse which approaches zero voltage. From the FIG. 3 depiction, it is seen that the occurrence of this signal at the Z terminal will pull junction 77 down to a low voltage level thus forcing transistor 84 into conduction if even a small positive voltage is present at the upper plate of capacitor 74. The INHIBIT signal, also illustrated as an essentially zero voltage level signal when effective, serves to pull junction 72 (terminal A of transistor 84) to zero potential and hence prevents or inhibits transistor 84 from conducting. In this manner, the $V_C$ waveform of FIG. 2 is achieved in accordance with the FIG. 3 illustrated embodiment of the present invention.

As earlier indicated, comparator 36 generates the INHIBIT signal whose function has been explained. One possible implementation of this comparator is shown in FIG. 3 and includes the series combination of a resistor 86, zener diode 88, diode 90 and resistor 96 connected across the output of bridge 32. A transistor 94 has its base connected via a diode 92 to the junction of diode 90 and resistor 96 while the collector of transistor 94 is connected to one output of bridge 32. The emitter of transistor 94 is connected to terminal 72 of oscillator 26 and serves to provide the INHIBIT signal. Zener diode 88, in correspondence to the earlier description, serves to develop the bias signal $V_B$ (FIG. 1). In accordance with that earlier discussion, when the voltage of bridge 32 falls below the bias level, the emitter voltage of transistor 94 drops to thus prevent the generation of gating pulses as earlier described.

From the foregoing it is seen that there has been provided a relatively inexpensive system which allows for improved operation of a triac voltage regulator and one which permits a possible restarting in the event of a voltage irregularity at the source. While there have been shown and described what are at present considered to be the preferred embodiments of the present invention, modifications thereto will readily occur to those skilled in the art. For example, it is not necessary to employ the particular type of oscillator or comparators shown in the illustrated embodiment and other forms of these elements could be used with equal facility. It is not desired, therefore, that the invention be limited to the specific arrangement shown and described and it is intended to cover in the appended claims all such modifications as fall within the true spirit and scope of the invention.

What is claimed is:

1. In a voltage control system, means for generating gating pulses operative to render conductive a triac to thereby control the electrical power supplied to a load from an a.c. voltage source comprising:
    (a) an oscillator operable, to produce pulses effective to render said triac conductive, in first and second modes, said second mode being at a higher frequency of pulse occurrence than said first mode;

(b) means to generate a first signal indicative of the source voltage;

(c) means responsive to said first signal to apply a synchronizing signal and additional means to apply a second signal indicative of the voltage across said load to said oscillator to initiate operation of said oscillator in said first mode;

(d) a feedback loop, connected to said oscillator, including means responsive to the first pulse produced in each half-cycle of said source voltage to generate a signal to place said oscillator in said second mode of operation; and, (e) means responsive to said first signal operable to inhibit the production of said pulses when said source voltage has a magnitude less than a prescribed value in each half-cycle of said voltage source.

2. The invention in accordance with claim 1 further including:

(a) means to sense load current and develop a load current signal proportional thereto; and, (b) means associated with said feedback path and responsive to said current signal to develop a further signal operative to place said oscillator into said first mode of operation.

3. The invention in accordance with claim 1 wherein said oscillator is a relaxation oscillator.

4. The invention in accordance with claim 1 wherein said oscillator is a relaxation oscillator and wherein said means to apply said first signal indicative of the source voltage comprises a full wave rectifier.

5. The invention in accordance with claim 1 wherein the means to apply said second signal indicative of the voltage across the load includes a differential amplifier for developing an error signal for application to said oscillator, said error voltage being proportional to the difference between the actual load voltage and a predetermined reference value.

6. The invention in accordance with claim 1 wherein said last recited means includes a comparator for supplying an additional signal to said oscillator to inhibit the production of said pulses.

7. The invention in accordance with claim 1 wherein said feedback loop includes a monostable multivibrator which is placed into a one of its states of operation upon the application of said first pulse to generate a signal which places the oscillator in the second mode of operation.

8. The invention in accordance with claim 2 wherein said feedback loop includes a monostable multivibrator which is placed into a one of its states of operation upon the application of said first pulse to thereby generate a signal which places the oscillator in the second mode of operation and which is forced into the second of its state of operation upon the application thereto of said further signal.

9. The invention in accordance with claim 3 wherein said relaxation oscillator includes a capacitor which is charged to a threshold value selectively at first and second rates to thereby effect said first and second modes of operation.

10. A voltage control for governing the operation of a triac to thereby control the voltage supplied to a load from an a.c. source comprising:

(a) an oscillator operable to produce gating pulses effective to render said triac conductive, said oscillator capable of being operated in either of two modes in response to selected input signals, said second mode of operation having pulses more closely spaced in time than the pulses of said first mode;

(b) first means responsive to the source voltage to provide a synchronization signal for application to said oscillator at a designated time during each half-cycle of the source voltage;

(c) second means responsive to the source voltage to provide an inhibiting signal for application to said oscillator each time said source voltage falls below a prescribed value, said inhibiting signal serving to inhibit the application of gating pulses to said triac; and, (d) means to govern the mode of operation of said oscillator between said first and second modes of operation including (1) amplifying means to produce an error signal proportional to the difference between the actual and desired levels of load voltage, (2) means to apply said error signal to said oscillator to thereby control the time of generation of the first gating pulse for said triac, and (3) means responsive to said first gating pulse to render said error signal ineffective and to thereby apply a signal of a different level to said oscillator to cause said oscillator to operate in said second mode of operation.

11. The invention in accordance with claim 10 wherein said first and second means responsive to the source voltage each includes a comparator.

12. The invention in accordance with claim 10 further including means, responsive to a load current of a prescribed value, operative to cause said oscillator to resume operation in the first mode.

* * * * *